United States Patent

Tanenhaus

[15] 3,675,030

[45] July 4, 1972

[54] FAST LASER PROJECTILE DETECTION SYSTEM

[72] Inventor: Martin Tanenhaus, Suitland, Md.

[73] Assignee: The United States of America as represented by the Secretary of the Navy

[22] Filed: Jan. 25, 1971

[21] Appl. No.: 109,269

[52] U.S. Cl. ............................250/222 R, 250/209, 356/28, 324/178

[51] Int. Cl. ..........................................................G01p 3/68

[58] Field of Search..................250/209, 217, 222, 221, 206, 250/214 R; 330/59; 356/28; 324/178

[56] References Cited

UNITED STATES PATENTS

| | | | |
|---|---|---|---|
| 3,567,951 | 3/1971 | Montgomery et al | 250/222 |
| 3,430,106 | 2/1969 | McDowell | 250/206 X |
| 3,315,176 | 4/1967 | Biard | 330/59 |
| 3,475,029 | 10/1969 | Hyman | 250/222 X |

*Primary Examiner*—Walter Stolwein
*Attorney*—R. S. Sciascia and Thomas O. Watson, Jr.

[57] ABSTRACT

The present invention is directed to an improvement in a system for measuring the ejection time and muzzle velocity of a gun. The measurement system utilizes a laser whose beam is split and then directed across the projectile ejection path to two photodetectors. When the gun is triggered, a projectile is fired and successively breaks the light paths between the laser beams and their associated photodetectors. The improvement comprises the use of analog and digital integrated circuit components in the detector portion of the measuring system. An analog device, a differential video amplifier, and a digital device, a differential dual line receiver, are combined with a photodetector and current amplifier to form the improved detector circuit.

5 Claims, 2 Drawing Figures

INVENTOR.
MARTIN TANENHAUS
BY Thomas O. Watson Jr.
ATTORNEY

FAST LASER PROJECTILE DETECTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A. Field of the Invention

The present invention relates generally to the field of ballistic measurements and more particularly to an improved detection circuit in a system for measuring the ejection time and muzzle velocity of a gun, especially a rapid fire machine gun.

B. Description of the Prior Art

In the prior art, there are various systems which are utilized for measuring the ejection time and muzzle velocity of a gun. One of the most effective systems discovered so far for measuring the above two characteristics of a gun is that disclosed in U.S. Pat. application, Ser. No. 815,689, filed Apr. 4, 1969, now U.S. Pat. No. 3,567,951. In the system disclosed therein, a laser is utilized whose beam is split and then directed across the projectile projection path of two photodetectors. When the gun is triggered, a projectile is fired and a first counter is activated. When the projectile is ejected from the gun barrel, it breaks the first light path between the laser and the first photodetector and turns off the first counter. Simultaneously, it initiates second counter which is deactivated when the light path to the second photodetector is broken by the projectile. The detector portion of that system utilizes essentially a photodetector and a conventional capacitor to provide start and stop pulses to counters from which the ejection time and muzzle velocity are obtained.

This method of activating the counters has been found to be occasionally unreliable and inaccurate. The rise time of the pulse from the detector used to activate the counters is not very high. Thus, the counters are not precisely initiated resulting in imprecise time and velocity measurements. Further, in order to adjust the sensitivity of the photodetector, the low load resistance is required to be greatly increased. This results, however, in a deterioration of the speed, that is, the response time, of the photodetector and a corresponding deterioration of the bandwidth of the photodetector signal. Thus, the overall operation of the measurement system is adversely affected. Further, the reliability of the above described detection circuit is undesirably low due to the relatively small photodetectory signal output. Often, the signal output from the photodetector was insufficient to trigger the counters. In other cases, while the output signal from the photodetector was discernable, it was found to have dissipated to such a point in traversing the coaxial cable path to the utilization equipment that it was insufficient to trigger the counters. This occurred, for instance, during the measurement of the ejection time and muzzle velocity of a machine gun located in a machine gun bay which was physically positioned quite distant from the utilization equipment, i.e., the counters and associated measuring equipment. Another problem with the operation of the above device is the accidental triggering of the counters caused by unwanted pulses induced in the circuit by the ambient noise present, for example, in a machine gun bay. Thus, the above device has been found to produce inaccurate and unreliable results.

SUMMARY OF THE INVENTION

The instant invention has been found effective in reducing or eliminating the above problems. The instant invention substitutes integrated circuit components for the detector portion of the above measurement system. The integrated circuit components comprise an analog device, a differential video amplifier, a digital device, a differential dual line receiver, and a current amplifier. The differential video amplifier increases the amplitude of the output signal of the photodetector, thus insuring that the strength of the signal will be sufficient to trigger the counters. The sensitivity of the photodetector may be increased by the gain adjustment means of the differential video amplifier without significantly affecting the response time of the photodetector and without necessitating a change in the load resistance. The differential dual line receiver eliminates the problem of accidental triggering of the counters due to erroneous pulses induced by ambient noise by its characteristic of high common mode rejection. That is, ambient noise signals present on both input lines to the differential dual line receiver are suppressed. The current amplifier insures that the pulse detected will have sufficient strength to trigger the counters after traversing the distance from the detection point to the utilization point. The use of the integrated circuit components improves the response time of the photodetector from milliseconds to nanoseconds. The output pulse of the inventive detector circuit additionally has a rise time much greater than that of the system described above, thus, enabling more accurate triggering of the counters.

OBJECTS OF THE INVENTION

The overall object of the present invention is the provision of improved means for measuring the ejection time and muzzle velocity of a gun.

A specific object of the invention is the provision of means for increasing the sensitivity of the detector portion of the measurement system without an adverse effect on the response time of the detector.

A further specific object of the invention is the provision of means for eliminating accidental triggering of the time counters of the measurement system caused by erroneously induced pulses from ambient noise.

Still another specific object of the invention is the provision of means for insuring accurate triggering of the time counters.

A still further specific object of the invention is the provision of means to insure that the strength of the output pulse from the detector portion of the measurement system will be sufficient to trigger the time counters after traversing the distance from the detection point to the utilization point.

Other objects, advantages and novel features of the present invention will become apparent from the following detailed description of the invention when considered in conjunction with the accompanying drawings.

DESCRIPTION OF THE PREFERRED EMBODIMENTS

Figure 1:
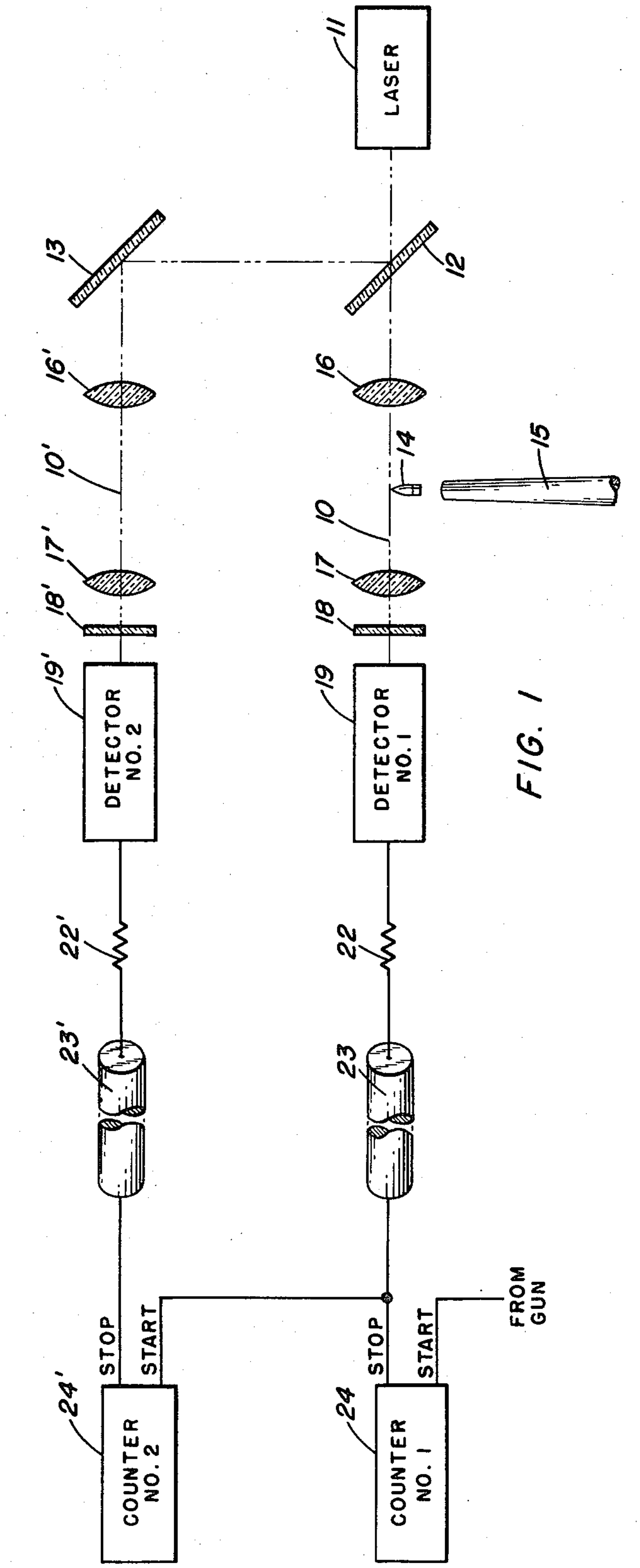
FIG. 1 illustrates a preferred embodiment of a measurement system utilizing the inventive detector.

FIG. 1, which illustrates a preferred embodiment of a measurement system incorporating the inventive detector, utilizes a laser 11 whose beam is directed over two parallel paths 10 and 10' by beam splitter 12 and mirror 13. The beams 10 and 10' are directed across the path taken by the projectile 14 after being fired from the gun 15. The laser beams are focused on the center of the projectile path by lenses 16 and 16' and are then expanded by lenses 17 and 17' and passed through optical filters 18 and 18', which pass only that light that has the frequency of the laser 11, to identical detector circuits 19 and 19'. In order to obtain the most accurate reading of ejection time possible, the laser beam 10 is so positioned with respect to the gun 15 that the front of projectile 14 will break the laser beam 10 as the back of projectile 14 is ejected from the gun 15. The two beam paths 10 and 10' are separated by a known distance. Upon interruption of their respective light beams, detectors 19 and 19' each emit a pulse to trigger or initiate counters 24 and 24'. In traversing the distance from the detection point, the location of detectors 19 and 19', to the utilization point, the location of counters 24 and 24', the output pulses of detectors 19 and 19' travel through impedance matching resistors 22 and 22' and across coaxial cables 23 and 23'.

Figure 2:
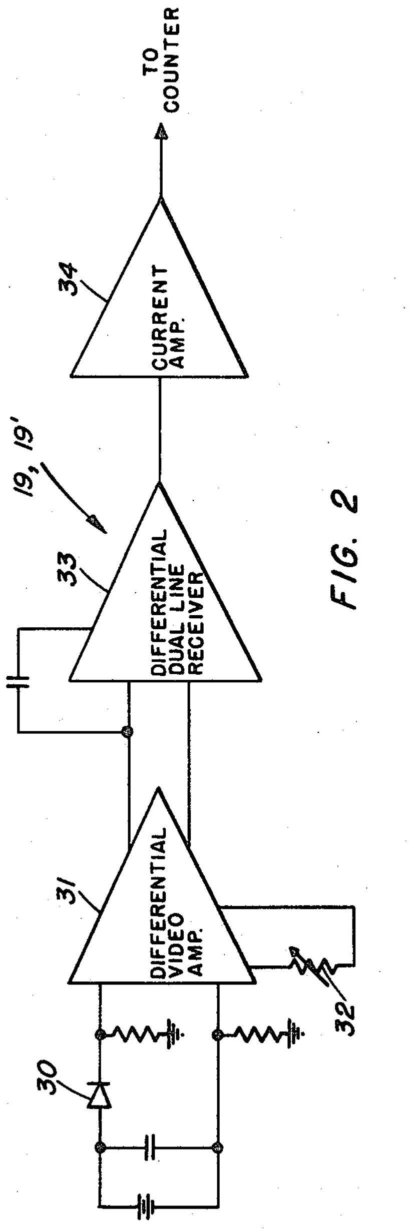
FIG. 2 illustrates a preferred embodiment of the inventive detector circuit.

FIG. 2 illustrates a preferred embodiment of the inventive detector circuit 19. The inventive detector circuit comprises three integrated circuits 31, 33 and 34 and a photodiode or photodetector 30. While the laser beam is illuminating the photodetector 30, the circuit is in a standby mode and no output signal from the detector will appear. However, upon interruption of the laser beam, the detector circuit will produce an output pulse to initiate either counter 24 or 24'.

The specific components of the inventive detector circuit may all be obtained as standard parts. For example, a PIN 10 photodetector from United Detector Technology may be employed as photodetector 30. Also a Fairchild μA733C amplifier may be utilized as the differential video amplifier 31. Further, a National Semiconductor (½) DM8870 receiver may be utilized for the differential dual line receiver 33. Finally, a National Semiconductor NH0002C amplifier may be utilized for the current amplifier 34.

The operation of the measurement system is as follows. The gun 15 is electronically fired. The signal that fires the gun 15 also triggers counter 24. When the back of projectile 14 is completely ejected from the gun, the front of the projectile interrupts laser beam 10. The detector immediately senses the interruption and emits an output pulse to stop counter 24 and to start counter 24'. The front of projectile 14 subsequently will interrupt the laser beam 10'. Detector 19', immediately sensing this interruption, emits an output pulse to stop counter 24'. The reading from counter 24 provides the ejection time of the gun 15. Knowing the distance between paths 10 and 10' and the reading from counter 24', the muzzle velocity of the gun 15 can be calculated.

The operation of the inventive detector circuit is as follows. The differential dual line receiver 33 has two modes of operation, the stand-by mode and the output mode. While the laser beam illuminates the photodetector 30, the receiver 33 will be maintained in a stand-by mode with a 0.3 volt output. When the light illuminating the photodetector 30 is less than that necessary to maintain the stand-by mode of the differential dual line receiver 33, as occurs when the laser beam is interrupted by projectile 14, the receiver 33 switches to its output mode, that is, to a 4.5 volt level.

The light intensity threshold setting of the photodetector 30 is determined by the gain adjust 32 of the differential video amplifier 31. Thus, the threshold setting or sensitivity of the photodetector 30 maybe adjusted by varying the gain adjust 32 of video amplifier 31.

The current amplifier 34 is used to protect the detector circuit from compacitive overloads and to sufficiently strengthen the output pulse from receiver 33 so that it will be able to trigger the counters 24 and 24' after traversinG the cables 23 and 23'.

A characteristic of the integrated circuit component 33 is that it has high common mode rejection. Thus, the receiver 33 is effective to suppress or eliminate ambient noise signals present on both input lines to the receiver and thereby prevent accidental triggering of the counters 24 and 24'. The threshold level of the receiver 33 is preset.

The differential video amplifier 31 is capable of changing the sensitivity of the photodetector 30 without an appreciable corresponding change in its speed. Previously in order to increase the sensitivity of a photodetector in similar circuits, for example, the detector circuit of the previously mentioned patent application, the load resistance had to be greatly increased, for instance, from 50 to 1,000 ohms. While this was effective in increasing the output signal, a corresponding deterioration in the bandwidth and speed, i.e., response time, of the photodetector followed. The differential video amplifier 31 eliminates this problem. The gain adjust 32 is capable of varying the sensitivity of photodetector 30 without an appreciable change in its speed or bandwidth. This results from the fact that in varying the gain adjust 32 from its minimum to its maximum positions, the bandwidth of the video amplifier 31 will vary only from 120 megacycles to 90 megacycles which will not significantly affect the speed of the detector.

Thus, the inventive detector circuit is capable of greatly improving the reliability and accuracy of the above described measurement system. Since it is obvious that many modifications, variations and other uses of the present invention are possible in light of the above teachings, it is to be understood that, within the scope of the appended claims, the invention may be practiced otherwise in as specifically described.

What is claimed is:

1. A device for measuring the ejection time and muzzle velocity of a gun comprising:

means for generating and directing first and second parallel beams of coherent light separated by a known distance across the projectile path of a gun;

first and second photodiodes operative to receive said first and second beams of coherent light, respectively;

first and second optical filtering means positioned adjacent to said first and second photodiodes, respectively, and operative to pass only that light which has the frequency of said generated coherent light;

first counting means electrically connected to said first photodiode, activated by the triggering means of said gun, deactivated by the interruption of said first light beam by a projectile fired from said gun and operative to indicate the ejection time of said gun;

second counting means electrically connected to said first and second photodiodes, activated by the interruption of said first light beam by said projectile, deactivated by the interruption of said second light beam by said projectile subsequently to the interruption of said first light beam by said projectile and operative to indicate the muzzle velocity of said gun;

first and second differential video amplifiers each having a pair of input terminals, one of each of said pair of terminals being connected to said first and second photodiodes respectively;

first and second sources of DC voltage connected to the other input terminals of said pair of terminals, and to said first and second photodiodes respectively; and, first and second means electrically connected to said first and second differential video amplifiers, for providing digital output signals indicative of the presence or interruption of said light beams on said photodiodes and for suppressing electrical signals resulting from the presence of ambient noise.

2. A device as recited in claim 1 further comprising first and second current amplifying means electrically connected to said first and second digital output means, respectively.

3. A device as recited in claim 2 in which said first and second differential video amplifiers, first and second digital output means and first and second current amplifying means are integrated circuit components.

4. A device as recited in claim 3 further comprising first and second means for varying the amplification characteristics of said first and second differential video amplifiers, respectively, over a range of values.

5. A device as recited in claim 1 in which said means for generating and directing first and second parallel beams of coherent light comprise:

a laser;

beam splitting means optically connected to said laser and operative to pass a first beam of coherent light and to reflect a second beam of coherent light;

reflective means optically connected to said beam splitting means and operative to direct said second beam of coherent light along a path parallel to the path of said first beam of coherent light; and first and second means in the paths of said first and second beams of coherent light, respectively, for focusing said light beams across the projectile path of said gun.

* * * * *